(12) United States Patent
Cheatle (10) Patent No.: US 7,813,618 B2
(45) Date of Patent: Oct. 12, 2010

(54) EDITING OF RECORDED MEDIA

(75) Inventor: Stephen Philip Cheatle, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1229 days.

(21) Appl. No.: 10/895,542

(22) Filed: Jul. 21, 2004

(65) Prior Publication Data

US 2005/0141859 A1    Jun. 30, 2005

(30) Foreign Application Priority Data

Jul. 24, 2003    (GB)    ................................ 0317306.9

(51) Int. Cl.
*H04N 5/91* (2006.01)
*H04N 5/93* (2006.01)
*H04N 7/08* (2006.01)
*H04N 7/00* (2006.01)
*G11B 27/00* (2006.01)

(52) U.S. Cl. ................... 386/83; 386/52; 386/95

(58) Field of Classification Search .............. 386/52, 386/83, 95; 715/203; 382/100
See application file for complete search history.

(56) References Cited

U.S. PATENT DOCUMENTS

| | | |
|---|---|---|
| 5,331,417 A | 7/1994 | Soohoo |
| 5,448,315 A | 9/1995 | Soohoo |
| 5,642,430 A * | 6/1997 | Greer et al. ............. 382/100 |
| 6,154,601 A | 11/2000 | Yaegashi et al. |
| 6,751,776 B1 * | 6/2004 | Gong ...................... 715/203 |
| 2002/0199194 A1 * | 12/2002 | Ali ........................... 725/46 |

FOREIGN PATENT DOCUMENTS

| | | | |
|---|---|---|---|
| EP | 0782139 A2 | * | 7/1997 |
| EP | 0843311 A2 | | 5/1998 |
| JP | 2002218367 | | 8/2002 |

OTHER PUBLICATIONS

The Patent Office, Search Report Under Section 17, Dec. 19, 2003.

* cited by examiner

*Primary Examiner*—Thai Tran
*Assistant Examiner*—Hung Q Dang (57) ABSTRACT

Various embodiments provide a system and method for editing of recorded media. Briefly described, one embodiment is a method comprising method comprising receiving an image signal captured by an image capture device, the image signal comprising a plurality of saliency values and a plurality of images, each of the images associated with one of the saliency values and the saliency values corresponding to at least one characteristic of the captured images; receiving specification of an overall duration of a program; and generating an editing signal indicative of the specified overall duration of the program and to the plurality of saliency values such that the generated editing signal corresponds to a plurality of portions of the image program having saliency values at least equal to a threshold, the corresponding portions being determined so that the total duration of the program corresponds to the specified overall duration of the program when durations of the indicative portions are summed together.

81 Claims, 3 Drawing Sheets

EDITING OF RECORDED MEDIA

TECHNICAL FIELD

Embodiments are generally related to image capture devices and, more particularly, is related to a system and method for editing of recorded media.

CLAIM TO PRIORITY

This application claims priority to copending United Kingdom utility application entitled, "Use of Saliency in Media Editing," having Ser. No. GB 0317306.9, filed Jul. 24, 2003, which is entirely incorporated herein by reference.

BACKGROUND

As electronic still and video cameras are progressively developed, they are becoming smaller and easier to use, with improving imaging capabilities. At the same time, the media on which the camera signals are stored are also becoming smaller and cheaper. With increasing battery lifetimes, it is now very easy to capture a very large amount of audio and/or visual data over a relatively short period, possibly a single session or trip, before any downloading of data is necessary. A potential outcome is the use of wearable camcorders which are continuously recording.

Not all of the recorded material will have the same degree of interest to the user, particularly when recording continuously. Accordingly and commonly, it will require editing to retain selections of the material, and possibly to re-order the selected material or edit it in other ways, such as by control of video reproduction speed, selection of key frames therefrom, or the duration of a still shot. However, the amount of time that a user will want to spend on editing the recorded material is not expected to increase in proportion to the storage capability of the camera, and is more likely to remain essentially constant.

In the past, despite the time and effort involved, such a problem has been accommodated by manual editing of the captured material to produce photo albums or edited home videos. During the editing process it is necessary to bear in mind the purpose for which the edited material is being produced, and different sets of edited material may be required for different purposes. Thus would render the editing process even more difficult and time consuming, and in practice, multiple edits from the same source material is done rarely, if ever.

Alternatively the problem has been avoided by judicious recording, as would have been the case when recording capacity was relatively limited, as in early electronic still cameras, or relatively expensive, as in photographic film cameras. Nevertheless, as will be appreciated, a choice in real time of what to record is often difficult, and particularly interesting or desirable "magic moments" are easily missed, which is why the idea of continuous recording for later editing is such a good idea in principle.

Therefore there is a need for an aid to the editing process to shorten the time and to reduce the effort required. Prior art aids may be described as:

(a) Manual editing tools for providing one or more edits of the same source material. These tools include paper based photo albums, their electronic equivalents such as PictureIt (Microsoft), electronic slideshow tools such as ACDSee, and video editing tools such as Adobe Premier, which are incorporated by reference herein.

(b) Automated video summarization or abstraction systems, on which much work has been done. In this context, "summarisation" generally refers to the generation of a set of key stills which represent the video and "abstraction" generally refers to the generation of a shorter video from parts of the source video. An example is the system provided by FXPAL, as described by A Girgensohn et al, "A Semi-Automatic Approach to Home Video Editing", UIST '00 Proceedings, ACM Press, pp 81-89, 2000, and incorporated by reference herein. This uses a fully automatic heuristic measure of "unsuitability" to break up long video shots into shorter clips. There is also the possibility of breaking clips on the basis of the audio commentary by automatic identification of sentence boundaries. While the user can specify the overall duration of the edited video, the user must also specify manually which clips are to be used and the order in which they are to be viewed. The specified duration apparently controls the threshold of "unsuitability" used to determine in/out points for each clip. Another exemplary system is that of Intel as described by R Lienhart in "Dynamic Video Summarization of Home Video", Proc. of IS&T/SPIE, vol 3972, pp 378-389, January 2000, and incorporated by reference herein, which groups shots in time based on the time stamp from a digital video camera. Using a technique in which the number of clips required by a fixed sampling rate is estimated, with in/out points being based on the audio content, long shots are sampled or subdivided to generate shorter clips. Again the user can specify the length of the edited video. Based on a hypothesis that all clips are equally important, the system is arranged to select clips in a "controlled random" manner. Depending on the ratio of the specified duration to the duration of the raw material, the system chooses a few "events" at random, and then picks a sequence of clips for each "event" at random.

(c) The use of professionally constructed interactive video material to control content and detail. U.S. Pat. No. 6,278,446 (Liou) describes a "System for Interactive Organization and Browsing of Video" which assumes an unknown, professionally edited, video source (and incorporated by reference herein). This is broken into shots which are then clustered into scenes or some other grouping, and in this instance an interactive method is used to correct an automated shot detection system and to organize the shots into a hierarchic arrangement which can be interactively viewed. The shot boundary detection system assumes that detecting explicit edit points in the source video is sufficient, which might or might not be true for material which has already been edited professionally, but is most unlikely to be the case for raw home video which typically will consist of very long shots which need to be broken up or reduced in some way. The clustering is designed to cater for situations which do not normally occur in home video, such as alternating shots between two camera views of the same event. U.S. Pat. No. 6,038,367 (Abecassis) "Playing a Video Responsive to a Comparison of Two Sets of Content Preferences" discloses an example of a system which selects the displayed content on the basis of user preference, and incorporated by reference herein. It is arranged for processing professionally produced material where the producer has already identified a profile consisting of one or more attributes for each segment of video material, and the viewer specifies a preference profile which is then matched against the profile of each video segment to determine whether or not that segment should be included in the version provided to the viewer. A typical use would be to allow a viewer to control the degree of sex and/or violence which they are shown from the source material.

SUMMARY

Various embodiments provide a system and method for editing of recorded media. Briefly described, one embodiment is a method comprising method comprising receiving an image signal captured by an image capture device, the image signal comprising a plurality of saliency values and a plurality of images, each of the images associated with one of the saliency values and the saliency values corresponding to at least one characteristic of the captured images; receiving specification of an overall duration of a programme; and generating an editing signal indicative of the specified overall duration of the programme and to the plurality of saliency values such that the generated editing signal corresponds to a plurality of portions of the image programme having saliency values at least equal to a threshold, the corresponding portions being determined so that the total duration of the programme corresponds to the specified overall duration of the programme when durations of the indicative portions are summed together.

Another embodiment comprises a memory configured to store an image signal captured by an image capture device, the image signal comprising a plurality of saliency values and a plurality of images, each of the images associated with one of the saliency values and the saliency values corresponding to at least one characteristic of the captured images; a user control operable by a user for specifying at least an overall duration of a programme; and a signal processor responsive to the specified overall duration of the programme and to the plurality of saliency values such that the generated editing signal is indicative of a plurality of portions of the image programme having saliency values at least equal to a threshold, the indicative portions being determined so that the total duration of the programme corresponds to the specified overall duration of the programme when durations of the indicative portions are summed together.

BRIEF DESCRIPTION OF THE DRAWINGS

Additional features and advantages of the invention will become clear upon a consideration of the appended claims, to which the reader is referred, and also upon a reading of the following more detailed description of embodiments of the invention made with reference to the accompanying drawings, in which:

Where appropriate the same reference sign is used for closely corresponding items in the different figures.

DETAILED DESCRIPTION

Embodiments relate to an editing system suitable for dealing with a raw camera image signal, in conjunction with an accompanying multi-value saliency signal. By "multi-value" is meant that the saliency signal has a least two non-zero values, whether a discrete valued signal or a continuously variable signal.

Figure 1:
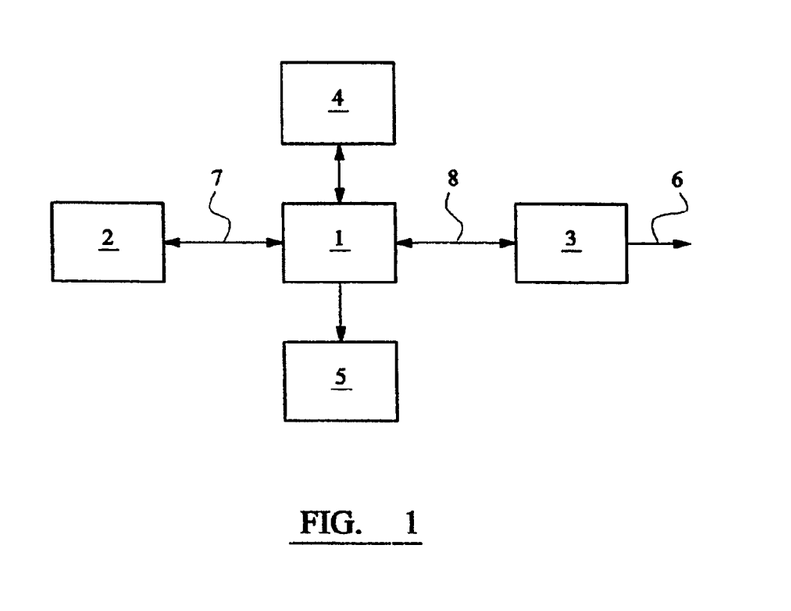
FIG. 1 is a schematic block circuit diagram of a first embodiment of apparatus according to the invention.

The apparatus shown in FIG. 1 is for use with a recorded camera source signal which is accompanied by a corresponding saliency signal having at least two non-zero values. It includes a central processor circuit 1 operatively coupled to first and second memories 2 and 3, and receiving outputs provided by a user control 4. Processor 1, which is preferably software driven, but may be implemented in hardware, also serves to transmit image and/or other signals to a display 5 as required by user control 4. The memory 2 is either arranged to receive signals downloaded from a camera memory, in which case memories 2 and 3 may be part of the same memory, or it may be a camera memory, e.g. a removable card or even part of the camera itself. Its output 7 to the processor 1 provides both the recorded image and recorded saliency signals. The memory 3 serves to receive and store the edited programme signals 8 from the processor 1, and provides a programme output 6 for later use or downloading as required under control of the processor 1 and user control 4.

Either the user control 4 is suitably arranged so that the user can specify the type of image signal (e.g. still or video) in the memory 2, or the processor 1 is arranged to identify the type of material automatically, e.g. from the signal format. The user control 4 is also arranged so that the user can (a) specify the length of the edited programme; (b) instruct the apparatus to provide the source or edited signal to the display 5 for viewing; and (c) interactively alter the saliency signal recorded in the memory 2. Other functions may be available, as will become clear when operation of the apparatus is described below.

The user control 4 can take any known form, for example individual controls for each function, or a programmed type of control function where the user is led through the options on the display 5 and makes choices of parameters which are then confirmed on the display. The chosen parameters may remain at a convenient position on the display 5 when the image signals are viewed, for example along the foot of the image.

Figure 2:
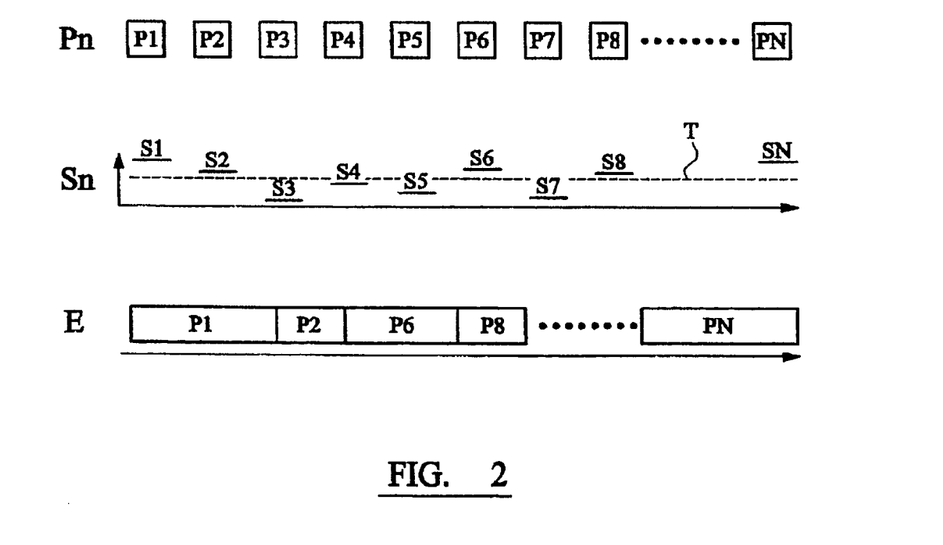
FIG. 2 is a diagram explaining the operation of the circuit of FIG. 1 when used for recorded still photographs with accompanying recorded saliency signals.

As indicated in FIG. 2, when used for still photographs, the source signal provides a series of still images, Pn (shown as P1 to PN), each accompanied by a saliency signal, Sn (shown as S1 to SN). In an exemplary embodiment, the signal Sn has seven (7) non-zero values, so is easily represented by a three digit binary number, and it is used both for selecting which of the images Pn are to be included, and for deciding how long each individual image will be viewed. The latter aspect is important for avoiding a monotonous image display rate and for enabling a longer look at the more interesting images.

The user operates the control 4 to specify to processor 1 the overall duration D of the programme arising from the edited signal 8, and the maximum (dmax) and minimum (dmin) shot durations for the images to be selected. Recognition of the signal type, e.g. still image, video or "burst", is effected automatically in some embodiments, but otherwise the control 4 is also operated to specify that the image signals are for still photographs. Upon completion of input from the user control, detected automatically or by a further user input, the processor 1 proceeds to compute the number of images (Nd) which can be displayed within the duration by dividing duration D by the mean shot length:

$$Nd=2D/(dmax+dmin)$$

The level of an inclusion saliency threshold T can then be adjusted until Nd images lie above it, and these images will have a saliency lying between a maximum value Smax and a minimum value 5 min. Then, for any image Pn in the selected set of Nd images, an initial estimate of shot duration dninit can be made from the saliency value Sn for that image. An exemplary manner of doing this is by way of linear interpolation:

$$dninit=dmin+(dmax-dmin)*(Sn-Smin)/(Smax-Smin)$$

At this stage the duration of the programme will be the sum V of the values dninit for all Nd of the selected images. Since the distribution of saliency values has not been taken into account, V may differ appreciably from D by an amount $\Delta=V-D$. Possible ways of adjusting this, if necessary and depending upon the particular embodiment, are (a) to distribute the amount $\Delta$ between some or all of the images at random; (b) to change the duration of each of the images by $\Delta/Nd$; or (c) to distribute the amount A systematically over the selected images according to the saliency values.

The resulting edited programme, E, is indicated in the bottom line of FIG. 2, where it can be seen that images P1, P2, P6, P8 and PN have been selected and that their durations increase with increasing height of Sn above the threshold value T. This programme E is appropriately stored in the memory 3, for example as the selected still images associated with their respective durations in the edited programme.

Figure 3:
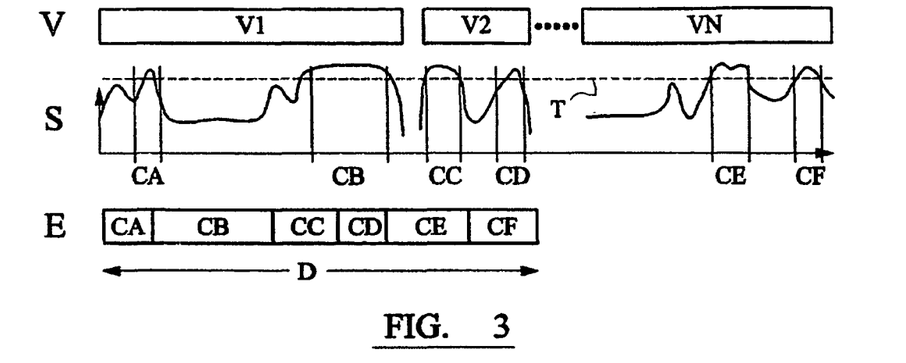
FIG. 3 is a diagram explaining the operation of the circuit of FIG. 1 when used for recorded video signals with accompanying recorded saliency signals.

FIG. 3 shows a plot similar to that of FIG. 2 but for a source video sequence V composed of a number of source clips, V1 to VN, accompanied by a saliency signal S with continuously variable level. The user operates control 4 to specify that the signal in memory 2 is video. With a very simple approach used by one embodiment, the user control 4 would be arranged to adjust the saliency threshold T until the total length of the selected portions CA to CF of the video equals D. It would then proceed to extract the selected portions from the memory 1, to join them using known techniques, and to store the edited programme E in the memory 3.

However, as shown, by operation of the user control 4, the maximum length of any clip is limited to dmax and/or the minimum length of any selected clip is made equal to dmin in various embodiments. These two aspects are respectively shown in the edited programme depicted in the bottom line of FIG. 3 for clip B (where some parts lying above T are not used), and for clips A and D (where some parts lying below T are used).

While above video approaches do provide an edited programme with high saliency, they fail to take account of optimal in/out points for each clip, and they do not attempt to generate a variety of clip durations in the range between dmax and dmin.

In another embodiment, the processor 1 is arranged to operate so that the inclusion threshold T is used merely to select where to take clips from the source material, and does not set the in/out points on the basis of the intersections of T and the saliency signal, or directly on maximum and minimum durations of extracted video portions.

Figure 4:
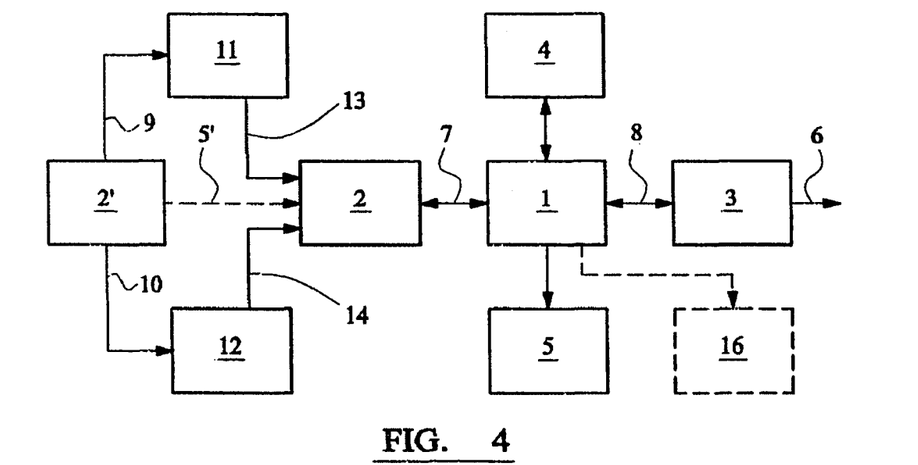
FIG. 4 is a schematic block circuit diagram of a second embodiment of apparatus according to the invention, for use with recorded video and sound signals, but not necessarily recorded saliency signals.

FIG. 4 shows the block circuit diagram of an embodiment of the invention employing this approach. It is useful for processing recorded signal from a video camera but it differs from the embodiment of FIG. 1 in that it can be used with recorded video signals lacking a recorded saliency signal S.

As shown, a memory 2' of or from the camera, or of the apparatus, contains recorded video image signals 9 and recorded audio signals 10, which in initial use of the apparatus, are passed under the control of processor 1 respectively through an image saliency circuit 11 and an audio saliency circuit 12. Image saliency circuit 11 analyses the video image to derive therefrom a measure of visual saliency. In one exemplary embodiment, the embodiment is similar to that described in our copending UK Patent Application No. 0118595.8, incorporated herein by reference, to provide a visual saliency output 13. Audio saliency circuit 12 analyses the audio signal 10 to derive therefrom by known techniques a measure of audio saliency to provide an audio saliency output 14. Signals 13 and 14 are then recorded in a memory 2 in association with the source signals 9 and 10. Optionally, if a further saliency signal 5' has been recorded in memory 2', for example by the method described in our copending UK Patent Application No. (ref: P21610 GB; 3002000058); incorporated by reference herein, this is also stored in the memory 2 in association with the other signals.

As determined by the user operating the control 4, the processor 1 uses as the multi-value saliency signal S (FIG. 5), either the signal 5' or the signal 13 or a desired combination of the two. Optionally, the audio signal 14 may also be involved in the formation of the signal S. However, in the operation of this embodiment particularly described with respect to FIG. 5 it serves only in defining certain time points as explained later, and the signal S equates to the signal 13.

As with the embodiment of FIG. 3, the mean shot length may be used by the processor to determine the number Nd of shots to be selected, and the threshold T may be adjusted until that number of shots lie above the saliency threshold. For each selected shot, a time point Tn corresponding to its maximum saliency value is then determined, as indicated by the vertical lines TA to TJ in the saliency plot S of FIG. 5.

Figure 5:
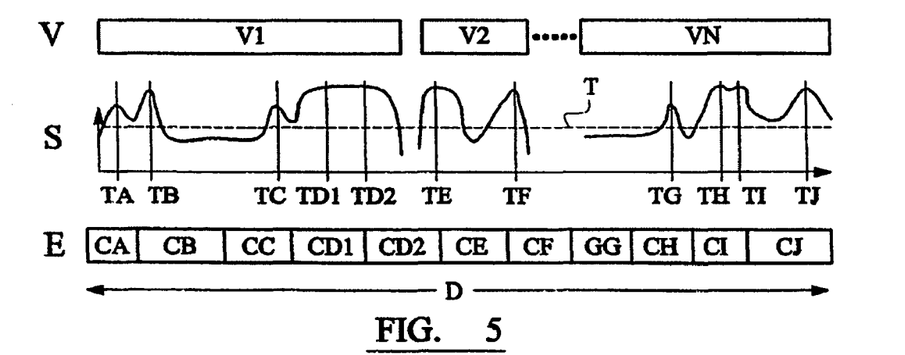
FIG. 5 is a diagram explaining the operation of the circuit of FIG. 4.

Optionally, long shots thus defined are broken by processor 1 into shorter sections so as to provide more than one time point per shot. For example a time point may be defined at each well defined local maximum of the saliency level, as shown for points TA and TB derived from a single portion lying continuously above T; or, if the saliency function is generally flat over a significant period, as in clip D, time points TD1 and TD2 may be determined by some other feature such as audio or visual content, and in the particularly described operation the processor is arranged (or instructed from the user control) to base such decisions on the audio saliency signal 14 so that time points such as TD1 and TD2 are located for example where audio saliency reaches separate local maxima.

Once the shots have been selected, each has its in and out points set by the processor to define the corresponding video clip. There is more flexibility than if saliency alone is used to set the in/out points, and the in and/or out points may even lie below the threshold T if appropriate, similarly to clips CA and CD of FIG. 3. In general there are a number of constraints to be satisfied:

1. The overall programme duration D. There may also be desired pace limits dmax and dmin, which set the maximum and minimum clip lengths.

2. The distribution of shot lengths—if possible long and short shot lengths should be interspersed for maximum visual variety.

3. The overall saliency of the programme, which desirably tends to a maximum value.

4. Natural constraints for each clip, for example, the start and end of the source material, and "unsuitability" metrics such as are used in Girgensohn mentioned previously.

Many techniques for selecting in and out points are possible. In one exemplary embodiment, the following process is used. The region about each time point is analyzed by the processor 1 to determine the earliest possible position for the in point and the latest possible position for the out point, for example on the basis of "unsuitability" of earlier/later material, end of the raw shot in the source material, etc. Subsequently, potential in/out points are identified by the processor 1 in the region between the earliest in point and the latest out point. As is recognized in the art, good in/out points are those which contain no or little motion in the scene, or breaks in speech, for example. To ensure that the maximum saliency point lies between any in point and any out point, only in points which precede the time point, and out points which follow the time point are identified by the processor.

Next the area under the saliency curve between the earliest in point and the latest out is determined by the processor for each shot, followed by linear interpolation to calculate a target duration for a clip from that shot which lies between dmax and dmin.

Each shot is then processed in turn, selecting the pair of in and out points from the alternative identified potential points so as to arrive at a clip duration which is closest to the target duration. The error between the calculated and actual clip durations is used to modify the target shot length for the next clip from the following shot, or it is dispersed among a plurality of the following shots. Finally the processor acts to extract the appropriate clips from the memory 2, to join them in the desired sequence, and to direct the resulting signal to memory 3 for storage.

In this way, the duration and size of the saliency signal for each shot determines the length of the corresponding clip, and the pace of the video, in terms of the number and duration of clips, is controllable at a high level to meet the user's preferences. Also the detailed clip boundary conditions are decided with full regard to the content of the video to avoid unnatural cuts.

The embodiment tends to cause the threshold level T to be lowered more than in the embodiment described above. Consequently, the resulting programme should contain more variety, and potentially prevent the problem of all of the time D being allocated to a relatively small number of long clips with high salience.

In a variation of the above embodiment, in and out points for the selected clips having a saliency value above a second, higher threshold value T' may be set so as to select the closest longer clip length to the target length (even if there is a closer shorter length possible). Other selected clips are allocated a closest shorter length to the target length, so that slightly more of the higher saliency material appears in the edited programme.

In various embodiments, the user control 4 (FIG. 3) may be set so that the edited programme may be reviewed on the display 5, and so that it may be paused or otherwise processed at any point as required. Optionally, the source material may also be viewed in a similar manner, but preferably in such a case either an addition display 16 is provided, or the display 5 is adapted to show a split screen to provide for both images.

Where interactive control is desired, the processor 1 may be arranged so that the saliency values recorded in memory 2 or another suitable memory may be adjusted by the user on the user control 4 when reviewing either source material and/or edited programme, so as to modify what goes into the edited programme. For example, the user may be able to stop the edited programme at any time, scan the source material about the corresponding time, and alter the saliency of parts thereof so as to include or exclude them from the edited programme. Depending upon the embodiment, it could be necessary to re-run the entire editing process, or at least to revise the editing of the remaining part of the programme, to ensure that the programme length is as specified by the user.

Optionally, the alterations in the recorded saliency signal(s) are recorded while the original values are retained. Also, in some embodiments, an optional provision is made to record sets of adjusted saliency values for a plurality of users, each set being associated with a user identifier. In this way different users may obtain different edited programmes from the same source material. Additionally, or alternatively, the user may be enabled to stop the review of the edited programme at any point, and adjust the set parameters, such as overall time or maximum/minimum durations, and to instruct the processor 1 to re-edit the remaining part of the programme accordingly.

A further refinement takes account of the fact that while the multi-value saliency signal may be fairly consistently generated for each individual recording session, with variations reflecting the associated saliency parameters, there may be considerable variation in absolute values between different sessions. In such an embodiment, this could result in contributions from one session unreasonably dominating the edited programme.

Embodiments may therefore include a facility to pre-scan the saliency signal over the entire length of the material to be edited, so as to attempt to normalize the saliency signal for different recording sessions prior to editing. As an example, the saliency signal may be adjusted so that the means and range over the whole of the material are generally consistent, e.g. by determining a local average of the signal, and its mean, over a moving time window, followed by shifting and scaling to ensure that the local average and range remain constant for the duration of the material to be edited.

Yet another embodiment takes account of the fact that the relative lengths of parts of the source material is unlikely to be what is needed to be reflected in the edited programme. Thus, there may be a long portion with relatively high saliency, but all concerning the same event, whereas a second equally interesting and salient event is represented by only a short portion of the source material. This would be expected to result in a similar imbalance in the edited result, and some form of correction is desirable.

It is normally possible to identify different events for example from an analysis of time stamps recorded with a camera signal so as to obtain an indication of the relative contribution each event makes to the source material. A corrective factor for each event may then be determined which is used for adjusting the contribution each event makes to the edited programme. As a simple illustration, if a first event contributes three times as much to the source material as a second event, and they both have the same overall degree of saliency (i.e. the portions selected for the edited programme on a simple saliency basis would also be in the three to one ratio), the saliency signal for the first event could be scaled down until the relative contributions of the first and second events in the edited programme become more equal (i.e. an automatic saliency adjustment prior to production of a final editing signal), or even more simply, a time limit could be imposed on the contribution from the first event.

Various embodiments therefore can be arranged so that it is possible to assign an overall saliency figure to each identified event or sequence in the source material, with the relative overall saliency figures for the events being used to adjust the contributions from the individual events in the edited programme.

Other embodiments include the facility to alter the speed of playback of at least some of the selected video clips, either per se, or additional to the normal playback of such clips. It may be useful for example when a longer programme duration is specified, to repeat high saliency selected clips containing significant motion at a lower speed; or if a shorter programme is specified, selected clips with little or no motion could be played back at a higher speed.

Another embodiment utilizes the visual or other saliency peaks to provide keyframes for indexing the full video content, but providing a fast viewable feature in their own right.

In some embodiments, the multi-value saliency signal may be generated in a number of different ways, and it may express a single dimension of saliency, such as of visual interest to the user or viewer, or of interest in the recorded scene as expressed by the camera user on the occasion of the recording, or of audio interest. It may be generated automatically or manually by the user or viewer. With an electronic camera, it may be recorded together with the camera image signal on the occasion that the camera is used, or it may be generated at another time, normally later, for example by a part of the apparatus according to the invention acting on a replayed video image signal or on an accompanying audio signal, or manually by a viewer of the recorded signal. Generation and recordal of a saliency signal at the time of camera signal recordal clearly can avoid the work involved in a later analysis of the recorded signal, whether this is automated or manual.

Alternatively, in other embodiments, the multi-value saliency signal may be a multi-dimensional quantity derived by appropriately combining two or more single dimensional saliency values, e.g. by logical or algebraic combination, for example using the sum of the values, the greatest value, or their product. Before such combination, which may be applied to one-dimensional saliency signals derived at the same time and/or to one-dimensional signals derived at different times (e.g. one generated during recording and another generated during playback), appropriate scaling or other manipulation of at least one saliency value may be necessary.

For example, as disclosed in our copending UK Patent Application No. 0118595.8, incorporated by reference herein, a saliency signal is generated by analysis of the movement of a feature within the viewed scene, either at the time of recordal, when it may be recorded together with the camera image signal, or, it may be generated on a subsequent occasion from the recorded signal.

Furthermore, in our copending UK Patent Applications Nos. GB 0225304.5 and 0324801.0, incorporated by reference herein, the signal may be provided in other embodiments directly by the user on the occasion of recordal using some form of manual or mechanical input to generate the signal according to the degree of interest or desire for the picture felt by the user during the occasion. Commonly the saliency signal will be provided simultaneously with the camera image signal. However, in some embodiments, the user may predetermine the saliency signal, for example where a particularly desirable image needs to be recorded. In this case, the only possibility of later generation of a saliency signal of this type would be to involve the user in viewing all of the recorded material once more, and in any case there is likely to a modification to the saliency signal when the user is subjected to the different circumstances of reviewing the recording, rather than the actual circumstances surrounding the original recording.

Some embodiments are concerned with the generation of an editing signal for providing an edited programme from raw source material. And, some embodiments may include a user operable control for specifying a characteristic of the programme.

Exemplary programme characteristics that might be specified by the user are the duration of the programme, the pace of the programme, or the minimum saliency of the programme. Commonly, one of these characteristics will be set by the user as a primary parameter, but other secondary parameters could also be under user control as will become clear later. The control may provide pre-set choices or a continuous control.

For the purposes of illustration, most of the description herein will relate to control of the duration of the programme. Nevertheless similar principles will be easily derived in respect of other programme characteristics in other embodiments. The reader will appreciate that the primary characteristics are not normally entirely independent of one another. For instance, the user may determine a saliency threshold, thereby providing a variable programme length, and in that case there could be supplementary control of the average shot (selected portion) time, or of minimum/maximum shot times, or with a smart choice of video in/out points. Minimum and/or maximum shot times (or alternatively a mean shot time and allowable variations therefrom) will affect the pace of the programme and could alternatively be the parameters primarily controlled by the user.

Some embodiments provide an editing signal for editing an image signal from a camera recording to provide a programme, the image signal being accompanied by a multi-valued saliency signal, the apparatus comprising a user operable control for specifying the value of at least one characteristic of the programme as a whole and a signal processor responsive at least in part to the output of the user operable control and to the multi-valued saliency signal for generating a said editing signal indicative of selected portions of the image signal having higher saliency values, the selected portions being determined so that the value(s) of the programme characteristic(s) at least approximates to the specified value(s).

While the editing signal could be stored per se, for later use with the image signal, the apparatus preferably includes selection means responsive to the editing signal for selectively transmitting the selected portions of said image signal either for immediate display or transmission, or to a store forming part of the apparatus. This embodiment enables a viewer to adjust the edited programme at the time of viewing to suit their needs. For example, it is quite possible to arrange the apparatus to respond effectively to a requirement that the viewer needs to see the highlights of a particular source material in a specified time, e.g. two minutes, or that the viewer wants to be entertained with interesting (or salient) material from the same source material for a specified time, e.g. 15 minutes, or even that the viewer wants to interact with the editing process (as described later) so that certain items of the source material are shown to a greater or lesser extent than would otherwise be the case based on the saliency level alone. The latter feature could be implemented by a viewer operated slider or rotary control (e.g. presented as a "go faster" or "slow down" control) which leads to dynamic adjustment of the overall duration and/or saliency threshold as the source material is being edited and viewed. It will be understood that in this way the same source material can be viewed in different ways to suit the needs of individual viewers by the use of high level viewer controls, as opposed to explicit manual editing as would be necessary with prior art arrangements, and that this is facilitated by the use of the multi-level saliency signal.

In some embodiments, it is possible to introduce a random or apparently random (or variable) element into the editing process, so that the same source material will be edited differently on successive viewings, and this feature could be particularly useful when the viewer merely wants to be entertained. Randomness may be obtained by introducing a random factor at any stage of the editing process, for example by adding a relatively low level time varying random factor (possibly plus 1, zero, or minus one) to the saliency signal before it is further processed, or by appropriately adjusting the output of a high level viewer control in a similar manner, or by introducing a decision step in the editing process which is randomly controlled. Variableness may be introduced in a similar manner, but with more control over the adjustment of the editing process.

For example, it may be that the number of saliency values is restricted to an extent that it does not entirely determine which images or portions are selected. Thus when selecting from a number of stored still images (e.g. 300 images), it may not be possible to view all of the images having the greatest saliency level (e.g. 50 images) because a minimum time for viewing individual images has been set (e.g. allowing only 25 images to be shown in the allocated time). In such a case, one embodiment makes a decision as to which images are to be shown. For example, possible choices are to show the same 25 images on each viewing, or to make a random selection at each viewing (which will be more interesting for the same viewer), or to deliberately vary the selection at each viewing so that over time all the selected images are viewed the same number of times which could mean making a record when each image is viewed. A variant of the latter process is to ensure that all 300 images are eventually viewed a number of times proportional to their saliency level, in which case the lower saliency level images are preferably fairly evenly distributed throughout the edited programme.

Thus, alternative embodiments provide for editing an image signal from a camera recording to provide an edited signal providing a programme, the image signal being accompanied by a multi-valued saliency signal, the apparatus comprising a user operable control for specifying a characteristic of the overall edited programme and a signal selection circuit means responsive at least in part to the output of the user operable control and to the saliency signal for selecting portions of the image signal associated with higher values of the saliency signal, the selected portions being determined so that the value(s) of the programme characteristic(s) at least approximates to the specified value(s).

The aforesaid said multi-value saliency signal may be derived by methods such as those exemplified herein.

Where the recording consists of video material, the signal processor 1 (FIG. 1) is arranged to maximize the saliency (e.g. the total or time integral of the multi-valued signal of all the selected portions) of the edited programme. Where the recording includes still images, the signal processor 1 may also be arranged to maximize the saliency provided there are additional constraints on the lengths of time that any individual still image may be shown, to prevent a single highest saliency signal being shown continuously.

In one embodiment, the signal processor 1 is arranged to set the durations of the different selected portions to reflect the multi-valued saliency level thereof. This is particularly applicable to still images, but can also be applied to video clips.

Alternatively, when dealing with a video signal, the processor 1 may be arranged to select those portions having a multi-valued saliency level above a threshold value T, and to set the value T so that the selected portions have a combined length substantially equal to the specified programme length.

In a somewhat related embodiment, the processor 1 may be arranged to select those portions having a multi-valued saliency level above a threshold value T, to set the value T so that the selected portions have a combined length substantially equal to the specified programme length, and subsequently to adjust the length of any portions having a length greater than said maximum duration to said maximum duration and/or to adjust the length of any portions having a length less than said minimum duration to said minimum duration. This embodiment tends to assume that a video sequence may be cut at any arbitrary point, but it is well known that there are some points (for example where there is minimum motion in the image) at which cutting provides a better result. Accordingly in a yet further embodiment, the processor 1 may be arranged to select those portions having a multi-valued saliency level above a threshold value T, and to set the value T so that the selected portions have a combined length substantially equal to the specified programme length, and subsequently to modify the length of at least one portion so as to adjust its in and/or out point to a more favorable time. In such a case, in one embodiment, the processor is arranged so that the timing error in programme length introduced by said adjustment is carried forward to the determination of the length of a subsequent selected portion or portions.

It may happen that one or more of the selected video clips is so long as to dominate the edited programme at that stage, or as to produce a boring programme. While this may be dealt with on the basis of settable or predetermined time constraints as outlined above, the processor may be arranged to respond to such a situation by subdividing it into a plurality of selected portions, for example on the basis of variations in the level of the multi-level saliency signal, and/or in response to features in an audio signal accompanying the recorded image signal.

In some embodiments, the apparatus is arranged so that the overall saliency (for example the saliency value integrated over the length of the edited programme) of the edited signal is maximized. In other embodiments, in particular those for dealing with video image signals, the apparatus is arranged so that the overall saliency tends to a high value which however is slightly less than the maximum because it takes in other restricting but desirable factors such as the implementation of appropriate video in and/or out points based on other criteria (that is to say, the saliency value is maximized consistent with other constraints).

The employment of a saliency signal having a plurality of values, as opposed to a binary signal (which could be considered as equating effectively to turning a camera on and off or operating a camera release button), enables a flexible framework in which sensible and effective decisions to be made concerning the edited video, as will become clear particularly when considering the embodiments of the invention.

For greater flexibility or freedom in editing, some embodiments additionally include a saliency adjuster for interactively adjusting the level of a said saliency signal while the edited signal is being provided. For example, by employing the user operable control, the user may be enabled to pause the editing process at a user selected stage, and to adjust the prevailing level of the multi-value saliency signal, either to include in the edited programme previously excluded portions of the recorded source signal, or to exclude previously included portions.

In some embodiments, for greater control over the resulting edited programme, the user operable control is arranged (e.g. in conjunction with the processor) to also permit the setting of at least one additional time constraint to affect the duration of said selected portions in the programme (thus affecting the pace of the edited programme), for example the setting of maximum and/or minimum durations for the selected portions (as more particularly described later), or the average duration.

Operation of this control may involve the shortening of an otherwise unduly long high saliency portion, for example either to provide one shorter extract or by cutting it into shorter spaced lengths which are then joined together. It may additionally or alternatively involve the rejection of short portions which would otherwise be selected for their higher saliency values. However another option is to lengthen such portions to include temporally adjacent lower saliency parts until the minimum duration is reached, either for all such portions or at least for the ones among such portions having the relatively higher saliency values.

Some embodiments can be arranged to provide an edited programme based on any combination of still and or moving (video) images, and can therefore be arranged to receive signals from a stills camera or a video camera, or a hybrid of the two. In this context, some cameras are capable of being operated in a number of different modes, including the provision of one or more of video sequences, single still images, and "burst" sequences consisting of a plurality of closely temporally spaced still images typically at between 1 and 5 frames per second and of higher resolution than frames of the video signal.

It is a consideration that under the conditions of home video, or the conditions under which the some embodiments might be used, the quality of video sequences can be significantly impaired for example by excessive camera movement, so that in the case a jerky video clip for example it might be more acceptable in the edited programme to replace part or all of the clip with a good single still frame derived from the clip, or a single frame from a "burst" sequence if available (preferably a frame with the highest salience), or even part or the whole of a burst sequence if available.

Where embodiments provide a programme consisting of a sequence of selected portions representing still images (from a still camera or from a video camera as just discussed), it may be arranged to set the durations of the different selected portions (commonly corresponding to single frames) to reflect the saliency thereof, normally so that the more salient stills are available for longer viewing in the edited programme. This is subject to the constraint of specified programme length, so that the more time that is allocated to very salient frames, the less time is available for other frames, some of which may need to be discarded as a result, for example.

Where the embodiment provides a programme consisting of a sequence of selected portions which are video clips, it may be arranged to set the duration of each selected portion to reflect an associated saliency value, for example its integrated or peak saliency value, so that more of the more interesting clips are viewed (as mentioned above, there may be other constraints such as in/out points to take into account). The associated saliency value could additionally or alternatively be employed in other ways—for example, a very salient clip could be repeated, or a clip with the highest salience could be repeated in slow motion, or a selected clip with the lowest saliency value could be played faster than normal. Such variations may be put into the framework of the specified programme length.

When embodiments provide a programme consisting of a sequence of selected portions which includes both video clips and still images, then more salient stills may be set to have longer durations, and more salient clips may be viewed for longer periods, as in the two preceding paragraphs. However, since the methods of allocating time are different for the two cases, it may be necessary to provide a rule for determining the absolute timings. For example, the stills may be treated for this purpose as video clips having their associated saliency values, so that their absolute durations within the edited programme are determined in the same way as the video clip periods. In an alternative option, the total number s of stills and the total number v of clips is initially assessed, and the edited programme length l is divided so that the stills occupy a total time of $l.s/(s+v)$ and the clips occupy the remainder of the programme time, with each of these time allocations then being divided according to relative saliency levels for example as in the two preceding paragraphs. Clearly there would be other ways of dividing the time between video clips and stills, depending on the desired end result.

Some embodiments further provide a method of creating an editing signal for editing an image signal from a camera recording to provide an edited programme, the image signal being accompanied by a multi-valued saliency signal, the method comprising the steps of specifying a characteristic of the programme as a whole and generating a said editing signal indicative of selected portions of the image signal having higher saliency values in response at least in part to the specified characteristic and to the multi-valued saliency signal, with the selected portions being determined so that the value of the programme characteristic at least approximates to the specified value. The editing signal can be recorded together with the image signal, i.e. the source material, for later use (in which case it is arranged to be temporally associated with the image signal, such as by incorporating the same time stamps, or by defining the times at which the image signal needs to be cut), or it is used as it is produced. When producing an edited programme the editing signal is supplied to a selection means, such as a switch receiving the image signal, for selectively transmitting the selected portions.

Figure 6:
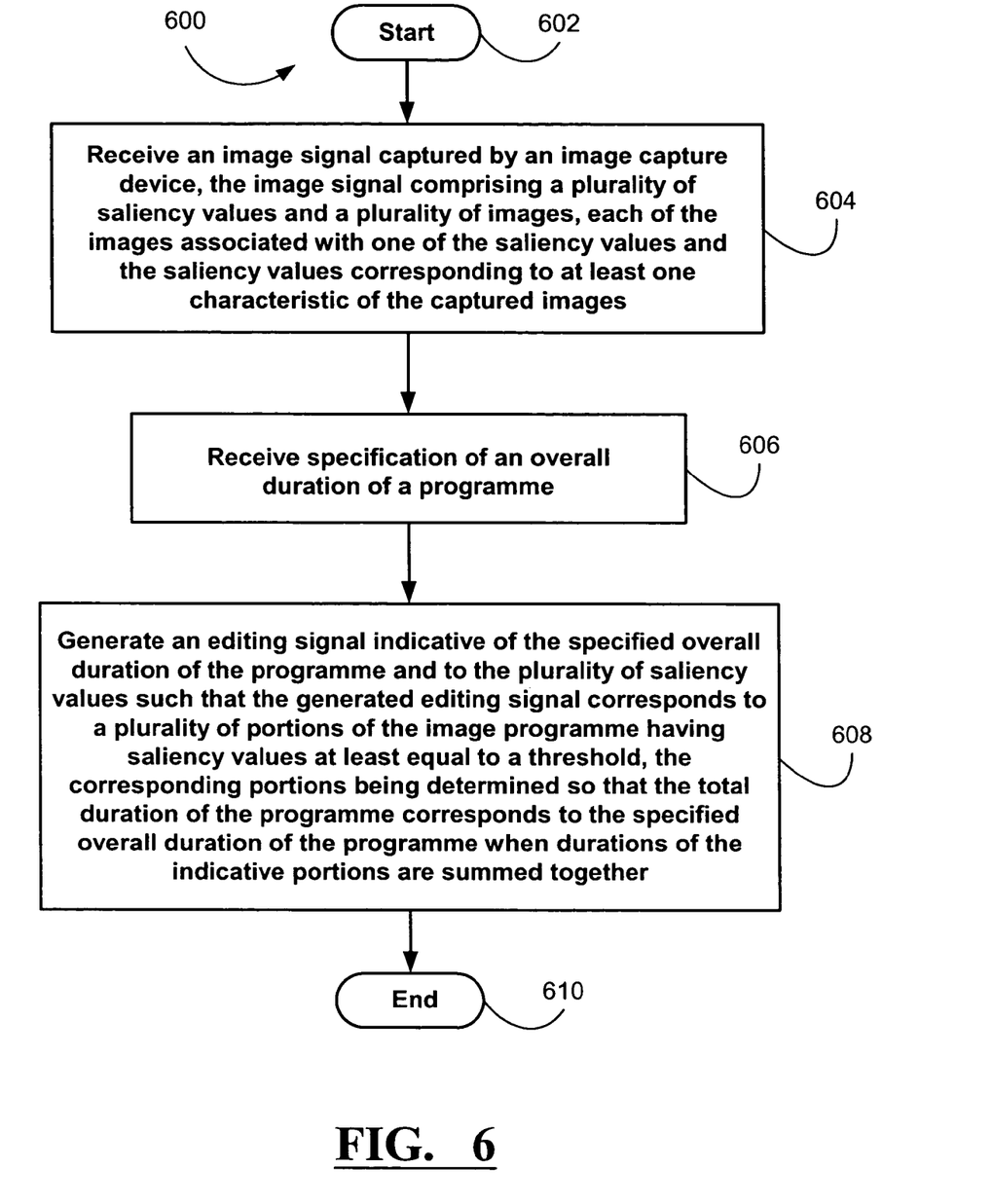
FIG. 6 is a flow chart illustrating the process used by an exemplary embodiment.

FIG. 6 is a flow chart 600 illustrating the operation of an embodiment for signal editing. The flow chart 600 shows the architecture, functionality, and operation of a possible implementation of the software for implementing an embodiment. In this regard, each block may represent a module, segment, or portion of code, which comprises one or more executable instructions for implementing the specified logical function(s). It should also be noted that in some alternative implementations, the functions noted in the blocks may occur out of the order noted in FIG. 6 or may include additional functions without departing significantly from the functionality of the various embodiments. For example, two blocks shown in succession in FIG. 6 may in fact be executed substantially concurrently, the blocks may sometimes be executed in the reverse order, or some of the blocks may not be executed in all instances, depending upon the functionality involved, as further clarified herein. All such modifications and variations are intended to be included herein within the scope of this disclosure.

The process begins at block 602. At clock 604, an image signal captured by an image capture device is received, the image signal comprising a plurality of saliency values and a plurality of images, each of the images associated with one of the saliency values and the saliency values corresponding to at least one characteristic of the captured images. At block 606, specification of an overall duration of a programme is received. At block 608, an editing signal is generated indicative of the specified overall duration of the programme and to the plurality of saliency values such that the generated editing signal corresponds to a plurality of portions of the image programme having saliency values at least equal to a threshold, the corresponding portions being determined so that the total duration of the programme corresponds to the specified overall duration of the programme when durations of the indicative portions are summed together. The process ends at block 610.

Although the invention has been described in terms of editing an image signal provided by an electronic still video or hybrid camera, it should be noted that the invention extends to circumstances where the image signal is derived in other ways, for example by the scanning of still or cine images to provide an electrical or other image signal.

What is claimed is:

1. An apparatus for providing a final editing signal, comprising:
    a memory configured to store an image signal captured by an image capture device, the image signal comprising an initial plurality of saliency values and a plurality of images, each of the images associated with a respective one of the initial plurality of saliency values and the initial plurality of saliency values corresponding to at least one characteristic of the captured images;
    a user control operable by a user for specifying at least an overall duration of a programme and a final plurality of saliency values associated with the plurality of images that differs from the initial plurality of saliency values, the final plurality of saliency values corresponding to at least one characteristic of the captured images; and
    a signal processor responsive to the specified overall duration of the programme and to the initial plurality of saliency values to generate an initial editing signal to include an initial plurality of portions of the plurality of images having initial saliency values at least equal to an initial threshold, the initial plurality of portions being determined so that the total duration of the programme corresponds to the specified overall duration of the programme when durations of the initial plurality of portions are summed together and the signal processor responsive to the specified overall duration of the programme and the final plurality of saliency values to generate the final editing signal to include a final plurality of portions of the plurality of images having final saliency values at least equal to a final threshold, the final plurality of portions being determined so that the total duration of the programme corresponds to the specified overall duration of the programme when durations of the final plurality of portions are summed together.

2. The apparatus of claim 1, wherein the user control is further operable by a user for specifying a maximum shot duration (dmax) and a minimum shot duration (dmin) such that each of the initial and final portions will be between dmax and dmin.

3. The apparatus of claim 1, wherein the user control is further operable by a user for specifying a minimum shot duration (dmin) such that each of the initial and final portions will be at least equal to dmin.

4. The apparatus of claim 1, wherein the signal processor compares an initial total programme duration corresponding to a sum of initial time durations of the initial plurality of portions having initial saliency values at least equal to the initial threshold, with the specified overall duration, and wherein the signal processor adjusts the initial durations of the initial plurality of portions so that the total duration of the programme corresponds to the specified overall duration of the programme when durations of the adjusted portions are summed together.

5. The apparatus of claim 4, wherein the initial threshold is adjusted to an adjusted threshold and wherein the initial durations of the initial plurality of portions are adjusted to correspond to the adjusted threshold, such that the total duration of the programme corresponds to the specified overall duration of the programme when durations of the adjusted portions are summed together.

6. The apparatus of claim 4, wherein when the initial total programme duration exceeds the specified overall duration by a delta ($\Delta$) duration amount, the $\Delta$ duration amount is distributed to a selected one of the initial plurality of portions such that the initial duration of the selected portion is adjusted such that the total duration of the programme corresponds to the specified overall duration of the programme when duration of the adjusted portion and the remaining initial durations are summed together.

7. The apparatus of claim 4, wherein when the initial total programme duration exceeds the specified overall duration by a delta ($\Delta$) duration amount, the $\Delta$ duration amount is apportioned at random and distributed among selected ones of the initial plurality of portions such that the initial durations of the selected portions are adjusted such that the total duration of the programme corresponds to the specified overall duration of the programme when the durations of the adjusted portions and the remaining initial durations are summed together.

8. The apparatus of claim 4, wherein when the initial total programme duration exceeds the specified overall duration by a delta ($\Delta$) duration amount, the $\Delta$ duration amount is apportioned at random and distributed among all of the initial plurality of portions such that the initial durations of the portions are adjusted such that the total duration of the programme corresponds to the specified overall duration of the programme when the durations of the adjusted portions are summed together.

9. The apparatus of claim 4, wherein when the initial total programme duration exceeds the specified overall duration by a delta ($\Delta$) duration amount, the $\Delta$ duration amount is distributed evenly among selected ones of the initial plurality of portions such that the initial durations of the selected portions are adjusted such that the total duration of the programme corresponds to the specified overall duration of the programme when the durations of the adjusted portions are summed together.

10. The apparatus of claim 4, wherein the signal processor is arranged so that a timing error in the total duration introduced by the adjusted durations is carried forward to the determination of a new duration of at least one subsequent selected portion.

11. The apparatus of claim 1, wherein the apparatus comprises the image capture device.

12. The apparatus of claim 11, wherein the memory, the user control and the signal processor reside in the image capture device.

13. The apparatus of claim 11, wherein the memory resides in the image capture device.

14. The apparatus of claim 11, wherein the image capture device captures the image signal to include at least one video image.

15. The apparatus of claim 11, wherein the image capture device captures the image signal to include a plurality of video images.

16. The apparatus of claim 11, wherein the image capture device captures the image signal to include a plurality of still images.

17. The apparatus of claim 1, further comprising a second memory wherein the programme is stored, wherein the total duration of the programme corresponds to the specified overall duration of the programme.

18. The apparatus of claim 17, wherein the memory and the second memory are separate medium.

19. The apparatus of claim 17, wherein the memory and the second memory are the same medium and reside in the image capture device.

20. The apparatus of claim 1, further comprising a display for displaying the programme, and wherein the user control operable by a user is adjustable for specifying a second overall duration (D) of the programme, wherein a second total duration of the programme corresponds to the specified second overall duration of the programme.

21. The apparatus of claim 1, further comprising a display for displaying the programme, and wherein the user control operable by the user is adjustable for specifying the final threshold that differs from the initial threshold.

22. The apparatus of claim 1, wherein the initial plurality of saliency values is a saliency value signal.

23. The apparatus of claim 1, further comprising an input for a saliency signal which has been generated on the occasion when the image signal was recorded.

24. The apparatus of claim 1, further comprising an input for a saliency signal which has been recorded on the occasion when the image signal was recorded.

25. The apparatus of claim 1, arranged for generation of a saliency signal by manual input from a viewer during a preview of the recording, and for recording thereof, prior to generation of said final editing signal.

26. The apparatus of claim 1, further comprising at least one saliency signal generator for generating a corresponding saliency signal from the recorded image signal.

27. The apparatus of claim 1, wherein a signal selection circuit means derives a multi-valued saliency signal by combining a plurality of separate saliency signals.

28. The apparatus of claim 1, further comprising a saliency adjuster for interactively adjusting the level of a saliency signal while the initial editing signal is being provided.

29. The apparatus of claim 1, wherein the signal processor is arranged to set the durations of respective said initial portions to reflect a multi-valued saliency level.

30. The apparatus of claim 1, wherein the signal processor is arranged to set the durations of the initial portions to reflect a minimum saliency level of said initial portions.

31. The apparatus of claim 1, wherein the signal processor is arranged to set the durations of the initial portions to reflect a pace of the programme.

32. The apparatus of claim 31, wherein the pace of the programme is determined by a minimum duration for each said initial portion.

33. The apparatus of claim 31, wherein the pace of the programme is determined by a maximum duration for each said initial portion.

34. The apparatus of claim 31, wherein the pace of the programme is determined by selecting a mean duration and an allowable variation from the mean duration.

35. The apparatus of claim 1, wherein a characteristic is the total duration of the programme, with durations of the initial portions being determined so that the total duration of programme at least approximates the specified overall duration, the signal processor being arranged to select those initial portions having a multi-valued saliency level above the initial threshold, and to set the initial threshold so that the initial portions have a combined duration substantially equal to the specified overall duration.

36. The apparatus of claim 1, for use with an image signal from a video camera recording, wherein a characteristic is the total duration of the programme, with durations of the initial portions being determined so that the total duration at least approximates the specified overall duration, the signal processor being arranged to select those initial portions having a multi-valued saliency level above the initial threshold, any initial portions having a length greater than a specified maximum duration being reduced to initial portions with an adjusted maximum duration, and any initial portions having a length less than the specified minimum duration being lengthened to initial portions with an adjusted minimum duration.

37. The apparatus of claim 1, wherein the signal processor is arranged to modify at least one initial portion so as to adjust an associated in point to a more favourable time.

38. The apparatus of claim 1, wherein the signal processor is arranged to modify at least one initial portion so as to adjust an associated out point to a more favourable time.

39. The apparatus of claim 1, wherein the signal processor is arranged effect a subdivision of at least one of the initial portions.

40. The apparatus of claim 39, wherein the signal processor is arranged to effect the subdivision at least in part in response to variations in the level of the saliency value.

41. The apparatus of claim 39, wherein the signal processor is arranged to effect the subdivision at least in part in response to features in an audio signal accompanying the image signal.

42. The apparatus of claim 1, further comprising a store for storing an output of the signal processor.

43. The apparatus of claim 1, further comprising a means to introduce a random factor during generation of the initial editing signal.

44. The apparatus of claim 1, further comprising a means to introduce a controlled variable factor during generation of the initial editing signal.

45. A method of signal editing, the method comprising:
receiving an image signal captured by an image capture device, the image signal comprising a first plurality of saliency values and a first plurality of images corresponding to a first session and a second plurality of saliency values and a second plurality of images corresponding to a second session that differs from the first session, each of the images associated with one of the saliency values and the saliency values corresponding to at least one characteristic of the captured images;
pre-scanning the image signal to normalize the first and the second pluralities of saliency values;
receiving specification of an overall duration of a programme; and
generating an editing signal indicative of the specified overall duration of the programme and to the first and the second pluralities of saliency values such that the generated editing signal corresponds to a plurality of portions of the first and the second pluralities of images having normalized saliency values at least equal to a threshold, the corresponding portions being determined so that the total duration of the programme corresponds to the specified overall duration of the programme when durations of the indicative portions are summed together.

46. The method of claim 45, wherein receiving specification of an overall duration of a programme further comprises receiving a specification from a user control operable by a user.

47. The method of claim 45, wherein receiving specification of an overall duration of a programme further comprises specifying a maximum shot duration (dmax) and a minimum shot duration (dmin) such that each of the portions of the programme will be between dmax and dmin.

48. The method of claim 45, wherein receiving specification of an overall duration of a programme further comprises specifying a minimum shot duration (dmin) such that each of the portions of the programme will be at least equal to dmin.

49. The method of claim 45, further comprising:
comparing an initial total programme duration corresponding to a sum of initial time durations of the plurality of portions having normalized saliency values at least equal to an initial threshold, with the specified overall duration; and
adjusting the initial durations of the plurality of portions so that the total duration of the programme corresponds to the specified overall duration of the programme when durations of the adjusted portions are summed together.

50. The method of claim 49, further comprising:
adjusting the initial threshold to an adjusted threshold; and
adjusting the initial durations of the plurality of portions to correspond to the adjusted threshold, such that the total duration of the programme corresponds to the specified overall duration of the programme when durations of the adjusted portions are summed together.

51. The method of claim 49, further comprising:
distributing, when the initial total programme duration exceeds the specified overall duration by a delta (Δ) duration amount, the Δ duration amount to a selected one of the plurality of portions such that the initial duration of the selected portion is adjusted such that the total duration of the programme corresponds to the specified overall duration of the programme when duration of the adjusted portion and the remaining initial durations are summed together.

52. The method of claim 49, further comprising:
apportioning at random, when the initial total programme duration exceeds the specified overall duration by a delta (Δ) duration amount, theΔ duration amount; and
distributing among selected ones of the plurality of portions the Δ duration amounts such that the initial durations of the selected portions are adjusted such that the total duration of the programme corresponds to the specified overall duration of the programme when the durations of the adjusted portions and the remaining initial durations are summed together.

53. The method of claim 49, further comprising:
apportioning at random, when the initial total programme duration exceeds the specified overall duration by a delta (Δ) duration amount, the Δ duration amount; and
distributing among all of the plurality of portions such that the initial durations of the portions are adjusted such that the total duration of the programme corresponds to the specified overall duration of the programme when the durations of the adjusted portions are summed together.

54. The method of claim 49, further comprising:
apportioning, when the initial total programme duration exceeds the specified overall duration by a delta (Δ) duration amount, the Δ duration amount; and
distributing evenly among selected ones of the initial plurality of portions such that the initial durations of the selected portions are adjusted such that the total duration of the programme corresponds to the specified overall duration of the programme when the durations of the adjusted portions are summed together.

55. The method of claim 49, further comprising deriving a multi-valued saliency signal at least in part directly from said image signal.

56. The method of claim 49, further comprising deriving a multi-valued saliency signal at least in part from a recording of a saliency signal derived from a manual input of a viewer previewing the programme.

57. The method of claim 45, further comprising detecting at least one of the first and the second pluralities of saliency values from a duration of the programme.

58. The method of claim 45, further comprising detecting at least one of the first and the second pluralities of saliency values from a pace of the programme.

59. The method of claim 45, further comprising detecting at least one of the first and the second pluralities of saliency values from a minimum saliency of the programme.

60. The method of claim 45, further comprising specifying the maximum duration and minimum duration of a selected one of the portions.

61. The method of claim 45, further comprising manually adjusting a multi-value saliency signal for parts of said image signal prior to production of a final editing signal.

62. The method of claim 45, further comprising automatically adjusting a multi-value saliency signal for parts of said image signal prior to production of a final editing signal.

63. The method of claim 45, further comprising introducing a variable factor into the process of generating the editing signal.

64. The method of claim 63, wherein the variable factor is a random factor.

65. The method of claim 63, wherein the variable factor is a controlled variable factor.

66. The method of claim 63, wherein the variable factor is introduced into a multi-valued saliency signal before it is used.

67. The method of claim 45, further comprising selectively transmitting said image signal under control of said editing signal.

68. The method of claim 67, further comprising recording said selectively transmitted signal.

69. A system for signal editing, comprising:
means for receiving an image signal captured by an image capture device, the image signal comprising a first plurality of saliency values associated with a first user identifier, a second plurality of saliency values associated with a second user identifier that differ from the first plurality of saliency values, and a plurality of images, each of the images associated with a respective one of the first plurality of saliency values and a respective one of the second plurality of saliency values and the first and the second pluralities of saliency values corresponding to at least one characteristic of the captured images;
means for receiving specification of first and second overall durations of respective first and second programmes;
means for generating a first editing signal indicative of the specified first overall duration of the first programme and to the first plurality of saliency values such that the generated first editing signal corresponds to a first plurality of portions of the plurality of images that forms the first programme having saliency values at least equal to a first threshold, the corresponding first plurality of portions being determined so that the total duration of the first programme corresponds to the specified first overall duration of the first programme when durations of the indicative first plurality of portions are summed together;
and means for generating a second editing signal indicative of the specified second overall duration of the second programme and to the second plurality of saliency values such that the generated second editing signal corresponds to a second plurality of portions of the plurality of images that forms the second programme having saliency values at least equal to a second threshold, the corresponding second plurality of portions being determined so that the total duration of the second programme corresponds to the specified second overall duration of the second programme when durations of the indicative second plurality of portions are summed together.

70. The system of claim 69, wherein the means for receiving specification of the first and the second overall durations of the first and the second programmes further comprises means for receiving first and second specifications from a user control operable by a user.

71. The system of claim 69, wherein the means for receiving specification of the first and the second overall durations of the first and the second programmes further comprises means for specifying a maximum shot duration (dmax) and a minimum shot duration (dmin) such that each of the first and the second pluralities of portions of the first and the second programmes will be between dmax and dmin.

72. The system of claim 69, wherein the means for receiving specification of the first and the second overall durations of the first and the second programmes further comprises means for specifying a minimum shot duration (dmin) such that each of the first and the second pluralities of portions of the first and the second programmes will be at least equal to dmin.

73. The system of claim 69, further comprising:
means for comparing an initial total programme duration corresponding to a sum of initial time durations of the first plurality of portions of the first programme having saliency values at least equal to the first threshold, with the first specified overall duration; and
means for adjusting the initial durations of the first plurality of portions of the first programme so that the total duration of the first programme corresponds to the specified first overall duration of the first programme when durations of the adjusted portions are summed together.

74. The system of claim 73, further comprising:
means for adjusting the first threshold to a third threshold; and
means for adjusting the initial durations of the first plurality of portions of the first programme to correspond to the third threshold, such that the total duration of the programme corresponds to the specified first overall duration of the first programme when durations of the adjusted portions are summed together.

75. The system of claim 73, further comprising:
means for distributing, when the initial total programme duration exceeds the specified first overall duration by a delta (Δ) duration amount, the Δ duration amount to a selected portion of the first programme such that the initial duration of the selected portion is adjusted such that the total duration of the first programme corresponds to the specified first overall duration of the first programme when duration of the adjusted portion and the remaining initial durations are summed together.

76. The system of claim 73, further comprising:
means for apportioning at random, when the initial total programme duration exceeds the specified first overall duration by a delta (Δ) duration amount, the Δ duration amount; and
means for distributing among selected portions of the first programme the Δ duration amounts such that the initial duration of the selected portions are adjusted such that the total duration of the first programme corresponds to the specified first overall duration of the first programme when the durations of the adjusted portions and the remaining initial durations are summed together.

77. The system of claim 73, further comprising:
means for apportioning at random, when the initial total programme duration exceeds the specified first overall duration by a delta (Δ) duration amount, the Δ duration amount; and
means for distributing among all of the portions of the first programme such that the initial durations of the portions are adjusted such that the total duration of the first programme corresponds to the specified first overall duration of the first programme when the durations of the adjusted portions are summed together.

78. The system of claim 73, further comprising:
means for apportioning, when the initial total programme duration exceeds the specified first overall duration by a delta (Δ) duration amount, the Δ duration amount; and
means for distributing evenly among selected portions of the first programme such that the initial durations of the selected portions are adjusted such that the total duration of the first programme corresponds to the specified first overall duration of the first programme when durections of the adjusted portions are summed together.

79. A non-transitory computer-readable medium storing a program for signal editing, the program comprising logic configured to perform:
receiving an image signal captured by an image capture device, the image signal comprising a first plurality of saliency values and a first plurality of images corresponding to a first session and a second plurality of saliency values and a second plurality of images corresponding to a second session that differs from the first session, each of the images associated with one of the saliency values and the saliency values corresponding to at least one characteristic of the captured images;
pre-scanning the image signal to normalize the first and the second pluralities of saliency values;
receiving specification of an overall duration of a programme; and
generating an editing signal indicative of the specified overall duration of the programme and to the first and the second pluralities of saliency values such that the generated editing signal corresponds to a plurality of portions of the first and the second pluralities of image having normalized saliency values at least equal to a threshold, the corresponding portions being determined so that the total duration of the programme corresponds to the specified overall duration of the programme when durations of the indicative portions are summed together.

80. The non-transitory computer-readable medium of claim 79, wherein the logic configured to perform receiving specification of an overall duration of a programme further comprises logic configured to perform receiving a specification from a user control operable by a user.

81. The non-transitory computer-readable medium of claim 79, the program further comprising logic configured to perform:
comparing an initial total programme duration corresponding to a sum of initial time durations of the plurality of portions having normalized saliency values at least equal to an initial threshold, with the specified overall duration; and
adjusting the initial durations of the plurality of portions so that the total duration of the programme corresponds to the specified overall duration of the programme when durations of the adjusted portions are summed together.

* * * * *

UNITED STATES PATENT AND TRADEMARK OFFICE
CERTIFICATE OF CORRECTION

PATENT NO. : 7,813,618 B2  Page 1 of 1
APPLICATION NO. : 10/895542
DATED : October 12, 2010
INVENTOR(S) : Stephen Philip Cheatle It is certified that error appears in the above-identified patent and that said Letters Patent is hereby corrected as shown below:

In column 19, line 33, in Claim 52, delete "theΔ" and insert -- the Δ --, therefor.

In column 22, line 20, in Claim 78, delete "durections" and insert -- durations --, therefor.

In column 22, line 42, in Claim 79, delete "image" and insert -- images --, therefor.

Signed and Sealed this
Twentieth Day of March, 2012

David J. Kappos
*Director of the United States Patent and Trademark Office*